(12) United States Patent
Diggs

(10) Patent No.: US 6,868,580 B1
(45) Date of Patent: Mar. 22, 2005

(54) SELF-LOCATING FASTENER AND METHOD

(75) Inventor: Paul Barth Diggs, Thousand Oaks, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 169 days.

(21) Appl. No.: 10/175,432

(22) Filed: Jun. 19, 2002

(51) Int. Cl.[7] .............................. F16L 5/00; H02G 3/22
(52) U.S. Cl. ............................................................. 16/2.1
(58) Field of Search ............................. 16/2.1, 2.2, 2.5;
174/65 G, 152 G, 153 G; 24/21, 25; 248/56, 68.1, 74.1, 74.4

(56) References Cited

U.S. PATENT DOCUMENTS

| | | | | |
|---|---|---|---|---|
| 4,002,822 A | * | 1/1977 | Kurosaki ................. 174/153 G |
| 4,262,409 A | * | 4/1981 | Madej ...................... 29/525.03 |
| 4,264,046 A | * | 4/1981 | Nattel et al. ................... 248/56 |
| 4,361,302 A | * | 11/1982 | Lass ............................... 248/56 |
| 4,517,408 A | * | 5/1985 | Pegram .................. 174/153 G |
| 4,685,172 A | * | 8/1987 | O'Connor ...................... 16/2.1 |
| 4,769,876 A | * | 9/1988 | Platt ............................. 24/459 |
| 4,961,554 A | * | 10/1990 | Smowton ..................... 248/68.1 |
| 5,234,185 A |   | 8/1993 | Hoffman et al. .............. 248/56 |
| 5,263,671 A | * | 11/1993 | Baum ......................... 248/68.1 |
| 5,494,245 A |   | 2/1996 | Suzuki et al. ............... 248/74.1 |
| 5,545,854 A |   | 8/1996 | Ishida ......................... 174/153 |
| 5,613,406 A | * | 3/1997 | Rutkowski ................. 74/502.6 |
| 5,639,993 A |   | 6/1997 | Ideno et al. ................. 174/153 |
| 5,669,590 A | * | 9/1997 | Przewodek ................. 248/68.1 |
| 5,733,497 A |   | 3/1998 | McAlea et al. .............. 264/497 |
| 5,742,982 A |   | 4/1998 | Dodd et al. ..................... 24/16 |
| 5,806,140 A | * | 9/1998 | Carlson et al. ................ 16/2.1 |
| 5,820,048 A | * | 10/1998 | Shereyk et al. ............ 248/68.1 |
| 5,911,790 A | * | 6/1999 | Bates et al. ................ 74/502.4 |
| 6,061,880 A | * | 5/2000 | Senninger ..................... 24/339 |
| 6,135,398 A | * | 10/2000 | Quesnel ...................... 248/74.1 |
| 6,186,454 B1 |   | 2/2001 | Olsen ....................... 248/218.4 |
| 6,211,465 B1 |   | 4/2001 | Streit ........................... 174/65 |

FOREIGN PATENT DOCUMENTS

EP        0407863 A    *    7/1990

* cited by examiner

Primary Examiner—Chuck Y. Mah
(74) Attorney, Agent, or Firm—Fulbright & Jaworski L.L.P.

(57) ABSTRACT

A method of forming a self-locating fastener includes determining a shape of a first contoured surface and a shape of a second contoured surface. The method continues by determining an offset of the shape of the first contoured surface and an offset of the shape of the second contoured surface. An inner contoured surface of a fastener is formed having a shape based at least in part on the offset of the shape of the first contoured surface. An outer contoured surface of the fastener is formed having a shape based at least in part on the offset of the shape of the second contoured surface. The fastener is operable to self-locate on the first and second contoured surfaces.

19 Claims, 3 Drawing Sheets

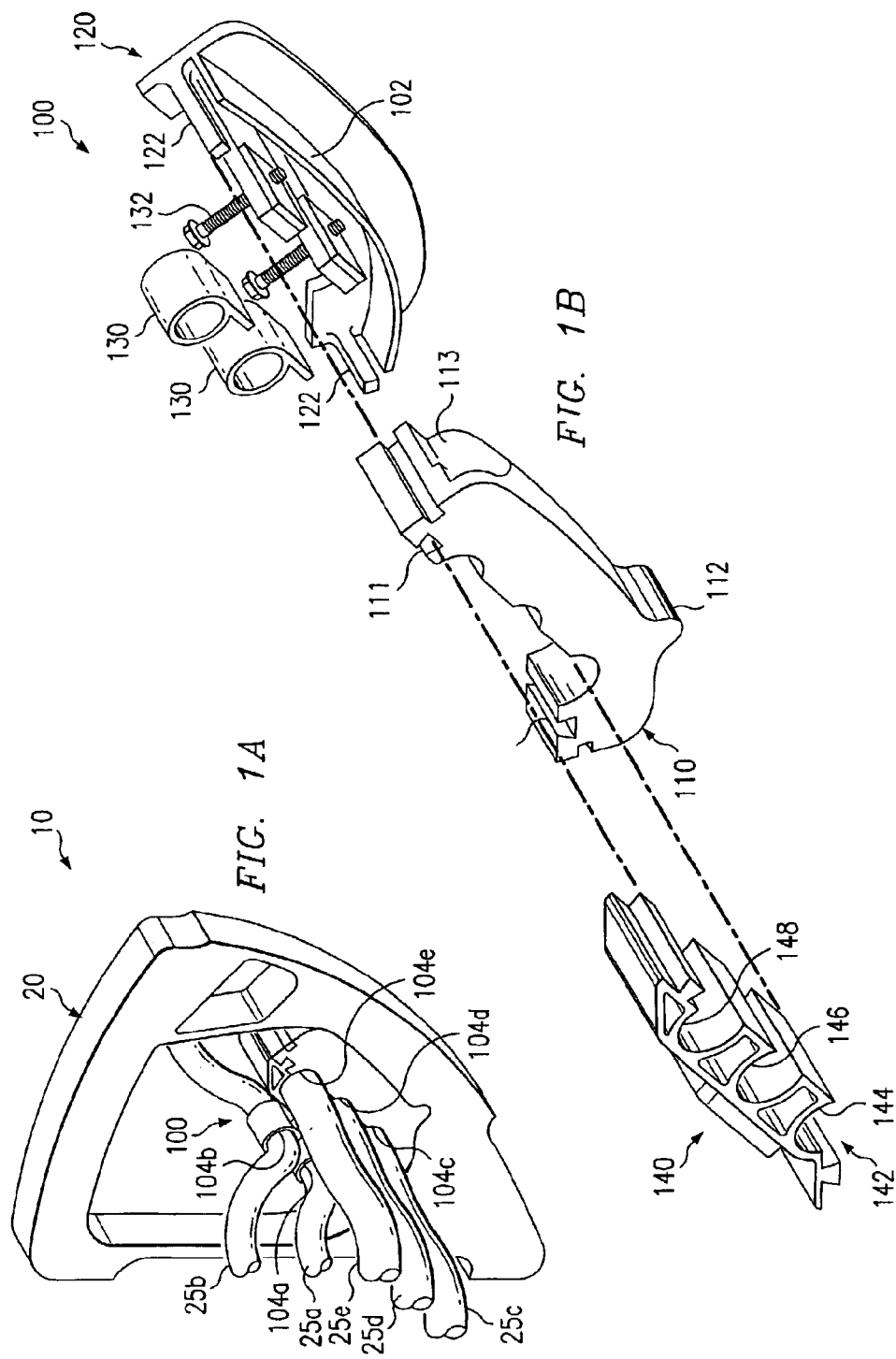

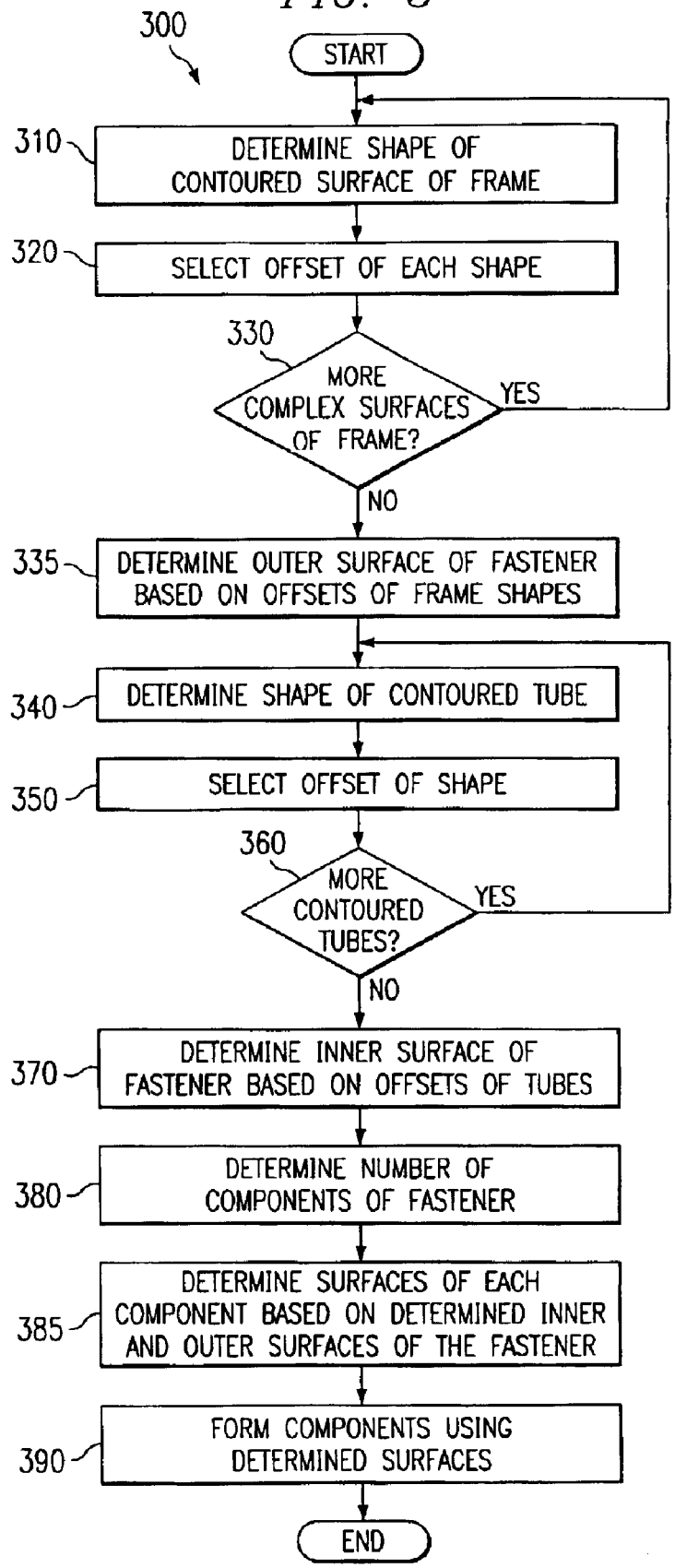

SELF-LOCATING FASTENER AND METHOD

TECHNICAL FIELD OF THE INVENTION

This invention relates generally to techniques for forming fasteners and, more particularly, to self-locating fasteners.

BACKGROUND OF THE INVENTION

Various structures, like aircraft, have requirements for wire harnesses, fuel tubes, hydraulic tubes, electrical conduits, and other internal assemblies to have rigid support points at certain intervals. Currently, sheet metal fasteners are used to support the wire harnesses or tubes. The sheet metal fasteners generally are attached to the primary structure by drilling holes and inserting rivets. These holes reduce the life expectancy of the primary structure. Additionally, drilling holes and inserting rivets is time consuming and costly. Due to installation variations, mislocated sheet metal fasteners may cause clearance issues or other assorted problems during assembly of the structure.

SUMMARY OF THE INVENTION

One aspect of the invention is a method for forming a self-locating fastener. The method includes determining a shape of a first contoured surface and a shape of a second contoured surface. The method continues by determining an offset of the shape of the first contoured surface and an offset of the shape of the second contoured surface. An inner contoured surface of a fastener is formed having a shape based at least in part on the offset of the shape of the first contoured surface. An outer contoured surface of the fastener is formed having a shape based at least in part on the offset of the shape of the second contoured surface. The fastener is operable to self-locate on the first and second contoured surfaces.

The invention has several important technical advantages. Various embodiments of the invention may have none, some or all of these advantages. The present invention may reduce fabrication and labor costs for various structures. Self-locating fasteners may also hold tubes and conduits at nominal position, thereby preventing clearance issues and improving assembly. Additional advantages may include low part cost, real-time fabrication, more complex tube routing, and less drilling on assembly. Other technical advantages of the present invention will be readily apparent to one skilled in the art.

BRIEF DESCRIPTION OF THE DRAWINGS

For a more complete understanding of the present invention and its advantages, reference is now made to the following descriptions, taken in conjunction with the accompanying drawings, in which:

FIG. 1A illustrates one embodiment of a self-locating fastener constructed in accordance with the present invention;

FIG. 1B illustrates an exploded view of the self-locating fastener of FIG. 1A;

FIG. 3 illustrates one method of forming the self-locating fastener of FIG. 1.

DETAILED DESCRIPTION OF EXAMPLE EMBODIMENTS OF THE INVENTION

Figures 2A, 2B:
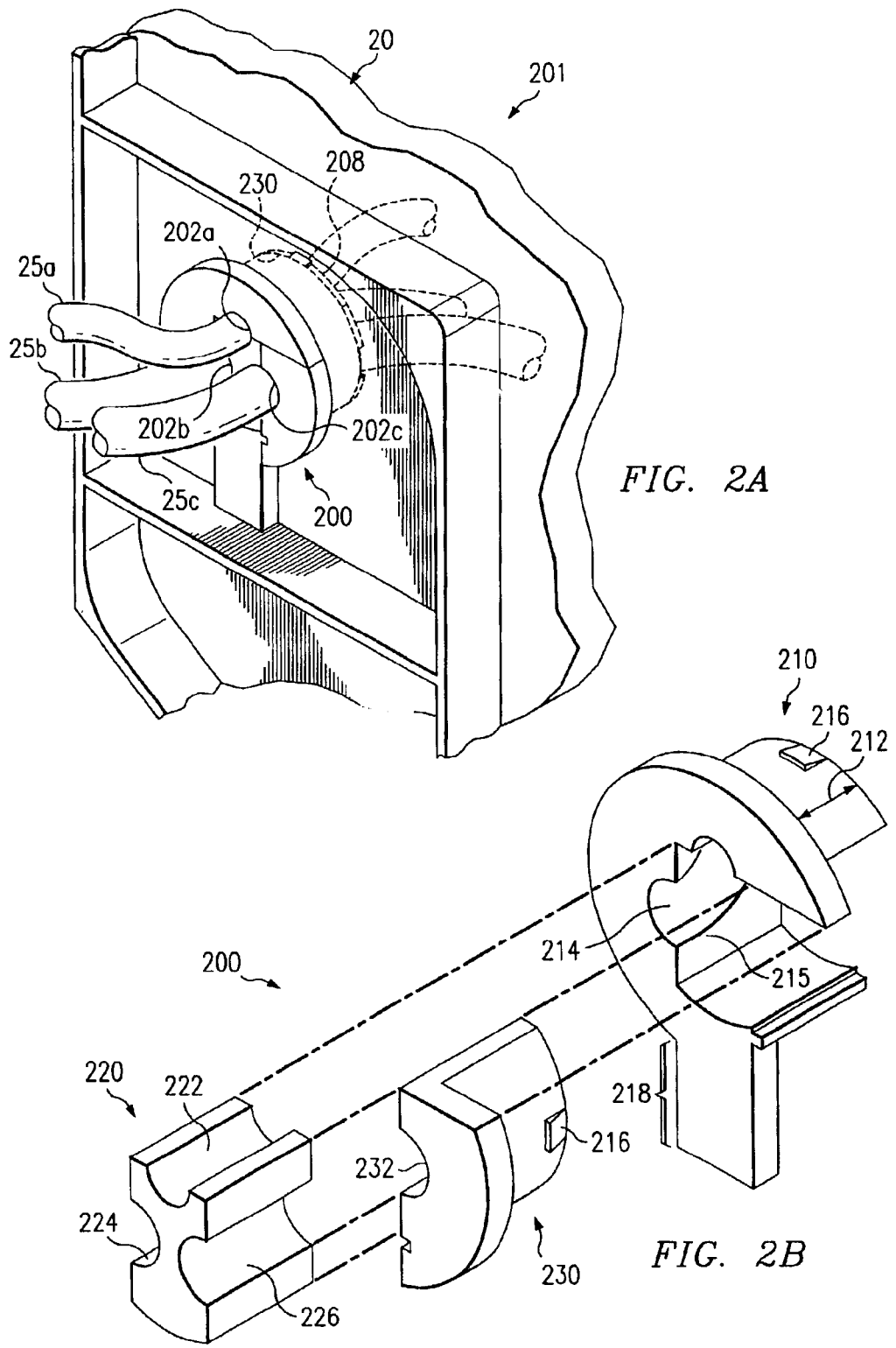
FIG. 2A illustrates another embodiment of a self-locating fastener constructed in accordance with the present invention.
FIG. 2B illustrates an exploded view of the self-locating fastener of FIG. 2A.

FIG. 1A illustrates one embodiment of a system 10 including a self-locating fastener 100 constructed in accordance with the present invention. In the illustrated embodiment, system 10 includes the fastener 100, tubes 25a–e, and frame 20. Other embodiments of system 10 may be used without departing from the scope of this disclosure.

Tubes 25a–e may comprise a first contoured surface that includes a plurality of shapes. Tubes 25a–e may be fuel tubes, hydraulic tubes, sensors, electrical conduits, penetrating a portion of frame 20, or any other internal assemblies that may be used, in part, to form an inner contoured surface of fastener 100 (or fastener 200 described below). It will be understood that tubes 25a–e are for example only. Tubes 25a–e may be generally referred to as tubes 25 and may include any number of tubes. Frame 20 may comprise a second contoured surface that includes a plurality of shapes. Frame 20 may include a cap, a web, a rib, a bulkhead, a tube 25 adjacent to the periphery of frame 20, or any other structure that may be used, in part, to form an outer contoured surface of fastener 100 (or fastener 200 described below).

Fastener 100 may be formed through Selective Laser Sintering (SLS) or some other manufacturing process. The fastener 100 may be manufactured using Duraform Polyamide (Nylon), Duraform HE Nylon, or any other appropriate material. Further, fastener 100 may be solid or may include internal air pockets. In this embodiment, fastener 100 is a block clamp. However, it will be understood that fastener 100 may also be an encapsulating fastener, a grommet, a saddle clamp, a bracket, a loop clamp, a wire guide, an anti-chafing guard or any other fastener.

In this embodiment, fastener 100 includes channels 104a–e and groove 102 (shown in FIG. 1B). Channels 104a–e may be generally referred to as channel 104 and may include any number of channels, generally corresponding to tubes 25a–e. Each channel 104 comprises one or more contoured, or complex, surfaces that form at least a portion of the inner contoured surfaces of fastener 100. Tubes 25 generally pass through and are held in position by channels 104a–e. Further, channels 104a–e may be formed so that each is operable to locate in a particular fashion on the appropriate contoured surfaces of tubes 25a–e, respectively. For example, each tube 25 may have a plurality of contoured surfaces including curves, tapering cylindrical shapes, and other complex surfaces. The shape of the appropriate contoured surface of each tube 25 is determined. The shape may include, for example, the dimensions of the contoured surface where a corresponding channel 104 of fastener 100 can be located. An offset from this shape is selected. For example, the offset may comprise 0.015 inches. The contoured surface of channel 104 is then determined having a shape that is based at least in part on the selected offset. In this regard, the inner contoured surfaces of fasteners 100 are customized according to the shape of tubes 25.

Groove 102 comprises one or more contoured, or complex, surfaces that form at least a portion of the outer contoured surface of fastener 100. Groove 102 may be formed to allow fastener 100 to locate in a particular fashion on the appropriate contoured surfaces of frame 20. The shape of groove 102 may be determined by first determining the appropriate contoured shape of frame 20. Therefore, groove 102 may be substantially similar in shape to one particular section of frame 20. For example, frame 20 may have a plurality of contoured surfaces including a rib, an extension, and other complex surfaces. The shape may include, for example, the dimensions of the contoured surface where groove 102 of fastener 100 can be located. An offset from this shape is selected. For example, the offset may comprise 0.015 inches. The contoured surface of groove 102 is then determined having a shape that is based at least in part on the selected offset. In this regard, groove 102 may allow for the fastener 100 to be secured in all three axes.

In one aspect of operation, fastener 100 self-locates on frame 20. Fastener 100 may be further operable to self-locate on one or more tubes 25. In this document, self-location may mean that fastener 100 (or fastener 200 described below) is correctly secured at one of a limited number of appropriate locations on frame 20, tube 25, and/or any other appropriate structure. Self-location may also mean that fastener 100 (or fastener 200 described below) is properly oriented on all three axes when secured to a contoured surface of frame 20, tube 25, and/or any other appropriate structure. Once the fastener is located on frame 20 and the one or more tubes 25, a polysulfide sealant, or some other sealant, may be used to substantially secure fastener 100 to the frame 20.

FIG. 1B illustrates an exploded view of the self-locating fastener 100. Fastener 100 includes first component 110, second component 120, third component 140, and loop clamp 130.

First component 110 includes groove 112, snap arm receptors 113, and rail grooves 111. The groove 112 is designed to partially encapsulate one complex portion of frame 20. In this embodiment, groove 112 is located in a dovetail portion of first component 110. The snap arm receptors 113 allow for second component 120 to be substantially secured to first component 110. It further ensures that the second component 120 and first component 110 are properly located in relation to one another and that fastener 100 will self-locate in the proper position on frame 20. Rail grooves 111 include any grooves or channels that secure third component 140 to first component 110 and, in this embodiment, form the channels 104c–e.

Second component 120 includes snap arms 122. The snap arms 122 slide into snap arm receptors 113 of first component 110. When fully engaged, the snap arm 122 may lock into place to substantially secure second component 120 to first component 110. Once adjacent, portions of the two pieces 110 and 120 may form groove 102 of FIG. 1A, which is operable to effect self-location of the fastener 100 on frame 20.

Third component 140 may include rails 142 and partial channels 144, 146, and 148. The rails 142 slide into the rail grooves 111 of first component 110. When fully engaged, the rails 142 may lock into place to substantially secure third component 140 to first component 110. The partial channels 144, 146, and 148 form contoured inner surfaces of third component 140. Once adjacent, these surfaces and portions of third component 140 may form channels 104c–e of FIG. 1A, which may be formed in predetermined locations to effect self-location of the fastener 100 on the appropriate contoured surfaces of tubes 25c–e, respectively. Therefore, third component 140 comprises a plurality of surfaces that form a portion of the inner contoured surface of the fastener 100.

In one embodiment of operation, first component 110 is installed on frame 20 by aligning groove 112 to the appropriate location on frame 20. In a particular embodiment, there may be one of a limited number of appropriate locations on frame 20. Next, the second component 120 is installed on frame 20 by aligning the snap arms 122 of second component 120 and the snap arm receptors 113 of first component 110. One or more snap arms 122 may include a locking feature to ensure that second component 120 and first component 110 are properly mated and to provide load capability in all three axes.

Third component 140 is installed by sliding rails 142 into rail grooves 111. The rail grooves 111 allow rails 142 to slide in from a single direction or from multiple directions. One or more rails 142 may include a locking feature to ensure that third component 140 and first component 110 are properly mated. In some embodiments, loop clamp 130 may be added to fastener 100 to allow fastener 100 to support additional tubes, shown here as tubes 25d and 25e.

It will be understood that, generally, fastener 100 may be easily disassembled. However, in one embodiment, polysulfide sealant, or some other sealant, may be used to substantially secure each of the various components of fastener 100 to one or more of the other components. Also, one or more bolts, inserted into embedded nuts or clip nuts, may be used to further secure the various components.

FIG. 2A illustrates another embodiment of a self-locating fastener 200 constructed in accordance with the present invention. In the illustrated embodiment, system 201 includes the fastener 200, tubes 25, and frame 20. Other embodiments of system 201 may be used without departing from the scope of this disclosure. In this embodiment, frame 20 includes a hole 230 that allows tubes 25 to pass through frame 20.

Fastener 200 may be manufactured through Selective Laser Sintering (SLS) or some other manufacturing process. The fastener 200 may be manufactured using Duraform Polyamide (Nylon), Duraform HE Nylon, or any other appropriate material. Further, fastener 200 may be solid or may include internal air pockets. In this embodiment, fastener 200 is a grommet. However, it will be understood that fastener 200 may also be an encapsulating fastener, a block clamp, a saddle clamp, a bracket, or any other similar fastener.

In this embodiment, fastener 200 includes channels 202a–c and extension 208. Channels 202a–c may be generally referred to as channel 202 and may include any number of channels, generally corresponding to tubes 25a–c. Each channel 202 comprises one or more contoured, or complex, surfaces that form at least a portion of the inner contoured surfaces of fastener 200. Tubes 25 generally pass through and are held in position by channels 202a–c. Further, channels 202a–c may be formed so that each is operable to locate in a particular fashion on the appropriate contoured surfaces of tubes 25a–e, respectively. For example, each tube 25 may have a plurality of contoured surfaces including curves, tapering cylindrical shapes, and other complex surfaces. The shape of the appropriate contoured surface of each tube 25 is determined. The shape may include, for example, the dimensions of the contoured surface where a corresponding channel 202 of fastener 200 can be located. An offset from this shape is selected. For example, the offset may comprise 0.015 inches. The contoured surface of channel 202 is then determined having a shape that is based at least in part on the selected offset. In this regard, the inner contoured surfaces of fasteners 200 are customized according to the shape of tubes 25.

Extension 208 comprises one or more contoured, or complex, surfaces that form at least a portion of the outer contoured surface of fastener 100. Extension 208 may be formed to allow fastener 200 to properly locate in a particular fashion on the appropriate contoured surfaces of the frame 20. In this example embodiment, fastener 200 locates in hole 230 in frame 20. The shape of extension 208 may be determined by first determining a shape of the hole 230 in frame 20. Therefore, extension 208 may be substantially similar in shape to the determined shape of hole 230. An offset from the shape of hole 230 is selected. For example, the offset may comprise 0.015 inches. The contoured surface of extension 208 is then determined having a shape that is based at least in part on the selected offset. Extension 208 may also be flexible to allow installation from only one side of frame 200. In this regard, extension 208 allows for the fastener 200 to be secured in all three axes on frame 20. For example, the x-axial distance of hole 230 and the x-axial distance of extension 208, shown as distance 212 in FIG. 2B, may vary only slightly. Extension 208 may also have one or more locking mechanisms that allow the fastener 200 to be secured in all three axes and installed from one side of frame 20. Thus the distance 212 may include the x-axial dimension of the locking mechanisms and the x-axial distance of hole 230.

In one aspect of operation, fastener 200 self-locates on frame 20. Once the fastener is located on frame 20 and the one or more tubes 25, a polysulfide sealant, or some other sealant, may be used to substantially secure fastener 200 to the frame 20.

FIG. 2B illustrates an exploded view of the self-locating fastener 200. Fastener 200 may include outer component 210, inner component 220, and end component 230.

In one embodiment of the present invention, outer component 210 may include upstanding leg 218, partial channels 214, fingers 215, and locking mechanism 216.

Upstanding leg 218 comprises one or more contoured, or complex, surfaces that form at least a portion of the outer contoured surface of fastener 200. The shape of upstanding leg 218 may be determined by first determining a shape of a first contoured shape of frame 20. Therefore, a contoured surface of upstanding leg 218 may be substantially similar in shape to one particular contoured surface of frame 20. For example, frame 20 may have a plurality of contoured surfaces including a rib, an extension, and other complex surfaces. The shape may include, for example, the dimensions of the contoured surface where upstanding leg 218 of fastener 200 can be located. An offset from this shape is selected. For example, the offset may comprise 0.015 inches. The contoured surface of upstanding leg 218 is then determined having a shape that is based at least in part on the selected offset. In this regard, upstanding leg 218 may lie substantially adjacent to frame 20 and may also substantially prevent axial rotation of the fastener 200.

Partial channels 214 form a complex inner surface of outer component 210. Each channel 214 may include one or more shapes based, at least in part, on a shape of the corresponding tube 25. The fingers 215 are inner extensions that may allow tubes 25 to be temporarily held in place during assembly of the fastener 200. Each locking mechanism 216 may be located at the edge of extension 208 and extend outward from extension 208 in order that the fastener 200 may be secured in all three axes.

Inner component 220 may include partial channels 222, 224, and 226. Each partial channel 222, 224, and 226 may form a complex outer surface of inner component 220. Each partial channel 222, 224, and 226 may include one or more shapes based, at least in part, on a shape of the corresponding tube 25. Therefore, inner component 220 comprises a plurality of surfaces that form a portion of the inner contoured surface of the fastener 200. End component 230 may include one or more partial channels 232. The partial channel 232 is one complex surface of end component 230. Partial channel 232 may include one or more shapes based, at least in part, on a shape of the corresponding tube 25. End component 230 may also include one or more locking mechanisms 216. Therefore, end component 230 comprises a plurality of surfaces that form a portion of the inner contoured surface of the fastener 200.

In one embodiment of operation, outer component 210 is installed in frame 20 by sliding extension 208 into hole 230 until the one or more locking mechanisms 216 catch on the frame 20. In a particular embodiment, there is one of a limited number of appropriate locations, like hole 230, for extension 208 to locate on frame 20. Next, one or more tubes 25 are each placed into a partial channel 214 where one finger 215 temporarily holds it during the remainder of the assembly process. As described above, partial channel 214 may be designed to properly locate on tube 25 at one of a limited number of appropriate locations.

Inner component 220 is installed by sliding it into the proper location of outer component 210. Once fully engaged, partial channels 222 and 224 of inner component 220 and partial channels 214 of outer component 210 form channels 202a–b of FIG. 2A, which are positioned in predetermined locations to effect self-location of the fastener 200 on one or more tubes 25. Next, end component 230 slides axially along one or more surfaces of inner component 220 and outer component 210 until the one or more locking mechanisms 216 catch on the frame 20 or outer component 210. Once properly mated, partial channel 226 of inner component 220 and partial channels 232 of end component 230 form channel 202c of FIG. 2A, which is positioned in predetermined locations to effect self-location of the fastener 200 on one tube 25.

It will be understood that, generally, fastener 200 may be easily disassembled. However, in one embodiment, polysulfide sealant, or some other sealant, may be used to substantially secure each of the various components of fastener 200 to one or more of the other components. Also, one or more bolts, threaded into embedded nuts or clip nuts, may be used to further secure the various components.

FIG. 3 illustrates one embodiment of a method 300 of forming a self-locating fastener, such as, for example, fastener 100 or 200. Although method 300 is described with respect to system 10 of FIG. 1A, it should be understood that it may also apply to system 201 of FIG. 2A. Also, any other suitable system may use method 300 to form a self-locating fastener without departing from the scope of this disclosure.

A shape of one contoured surface of the frame 20 is determined at step 310. As described above, this contoured surface may include a web, rib, bulkhead, moldline, or any other complex surface where it might be desirable to position the self-locating fastener 100. An offset is selected for each relevant shape of the contoured surface at step 320. This offset may be any measurable distance that allows for the fastener 100 to be substantially self-locating and, possibly, allows for a sealant to properly fit between the fastener 100 and the frame 20. For example, the offset may be a 0.015 inch gap that allows a polysulfide surface sealant to act as a bonding agent.

At decisional step 330, method 300 determines whether there are more complex surfaces of frame 20 that will accommodate the fastener 100. If the fastener may be adjacent to more than one surface, then method 300 returns to step 310. Otherwise, the method 300 proceeds to step 335. At step 335, the outer contoured surface of the fastener 100 is determined. This outer contoured surface has a shape that is based, at least in part, on the corresponding offsets of the shape of the contoured surface of frame 20, determined at step 320.

Execution proceeds to step 340 where the shape of a contoured surface of a tube 25 is determined. An offset is selected for the shape of the contoured surface at step 350. This offset may be any measurable distance that allows for the fastener 100 to be substantially self-locating on the tube 25 and, possibly, allows for fastener finger 215 to properly fit between a surface of the fastener 100 and the tube 25.

At decisional step 360, it is determined whether there are more tubes 25 to be positioned by fastener 100. If the fastener 100 will accommodate at least one more tube 25, then the method 300 returns to step 340. Otherwise, the method proceeds to step 370. At step 370, one or more inner contoured surfaces of fastener 100 is formed. The shape of the inner contoured surface(s) is based, at least in part, on the offsets of the shapes of the one or more tubes 25 selected at step 350. The inner surface(s) generally form one or more channels 104 used to position one or more corresponding tubes 25. For example, a first channel 104 has an inner contoured surface having a shape that is based, at least in part, on the offset of the shape of a first tube 25. A second channel 104 has an inner contoured surface having a shape that is based, at least in part, on the offset of the shape of a second tube 25. Further, each channel 104 may be placed in a predetermined location in relation to other channels 104 to further effect the self-location of fastener 100 on tubes 25.

Next, at step 380, the appropriate number of components of fastener 100 is determined. For example purposes only, fastener 100 in FIG. 1B includes four primary components: first component 110, second component 120, third component 140, and loop clamp 130. After the number of components is determined, the surfaces are determined for each component based on the determined inner and outer surfaces of the fastener 100 at step 385. It will be understood that a component may use none, some, or all of either the determined inner or outer surfaces of the fastener 100. The method ends at step 390, wherein each component of fastener 100 is formed according to the determined surfaces.

Although FIG. 3 illustrates one example of a method 300 of forming the self-locating fastener 100, various changes may be made to method 300 without departing from the scope of this disclosure. Also, while FIG. 3 illustrates two decisional steps 330 and 360, other and/or additional decisional steps may be used in method 300. Further, the order of decisional steps 330 and 360 is for illustration only.

Although the present invention has been described in detail, it should be understood that various changes, substitutions and alterations can be made hereto without departing from the sphere and scope of the invention as defined by the appended claims.

To aid the Patent Office, and any readers of any patent issued on this application in interpreting the claims appended hereto, applicants wish to note that they do not intend any of the appended claims to invoke 35 U.S.C. § 112, ¶ 6 as it exists on the date of filing hereof unless "means for" or "step for" are used in the particular claim.

What is claimed is:

1. A system for self-locating a fastener, comprising:
   a frame comprising an opening having a first contoured surface;
   a tube extending through the opening, the tube comprising a second contoured surface; and
   a self-locating fastener comprising:
   a first component having an outer contoured surface, at least a portion of the outer contoured surface substantially matching the first contoured surface of the opening minus a first offset; and
   a second component having an inner contoured surface, at least a portion of the inner contoured surface substantially matching the second contoured surface of the tube plus a second offset;
   wherein the first component is disposed within the opening by substantially matching the portion of the outer contoured surface of the first component with the first contoured surface of the opening; and
   wherein the second component is detachably coupled to the first component in such a manner that the portion of the inner contoured surface of the second component substantially matches the second contoured surface of the tube.

2. The system of claim 1, wherein the inner contoured surface comprises a channel.

3. The system of claim 1, wherein the self-locating fastener further comprises a third component detachably coupled to either the first or second component in such a manner that at least a portion of an inner contoured surface of the third component substantially matches the second contoured surface of the tube plus a third offset.

4. The system of claim 1, wherein the self-locating fastener further comprises a loop clamp configured to couple to either the first or second component.

5. The system of claim 1, further comprising a sealant adapted to fill a plurality of gaps caused by respective ones of the first and second offsets when the first component is disposed within the opening and the second component is detachably coupled to the first component.

6. The system of claim 1, wherein the first and second offsets are each approximately 0.015 inch.

7. The system of claim 1, wherein the first and second components are each formed from a nylon.

8. The system of claim 7, wherein the first and second components are each formed from a selective laser sintering process.

9. The system of claim 1, wherein the second component is detachably coupled to the first component with one or more fasteners.

10. The system of claim 1, wherein the second component comprises a locking tab to secure a position of the second component with respect to the first component.

11. A self-locating fastener, comprising:
    a plurality of components configured to couple to one another such that, when the components are coupled to one another, the components comprise:
    an outer contoured surface, at least a portion of which substantially matches a first contoured surface of a frame minus a first offset; and
    an inner contoured surface, at least a portion of which substantially matches a second contoured surface of a tube plus a second offset;
    wherein the components are configured to couple to the frame and to one another after the tube is disposed adjacent the frame; and
    a loop clamp configured to couple to at least one of the components.

12. The self-locating fastener of claim 11, wherein the self-locating fastener comprises a grommet.

13. The self-locating fastener of claim 12, wherein one of the components comprises an upstanding leg configured to prevent axial rotation of the self-locating fastener when the components are coupled to the frame.

14. The self-locating fastener of claim 11, wherein the self-locating fastener comprises a block clamp.

15. The self-locating fastener of claim 11, wherein at least one of the components comprises one or more fingers coupled thereto, the fingers operable to secure any two components together.

16. The self-locating fastener of claim 11, wherein at least one of the components comprises one or more grooves positioned along the outer contoured surface, the grooves operable to restrict movement of the self-locating fastener along an axis coinciding with a longitudinal axis of the tube when the components are coupled to the frame.

17. The self-locating fastener of claim 11, wherein the first and second offsets are each approximately 0.015 inch.

18. The self-locating fastener of claim 11, wherein the components are formed from a nylon.

19. The self-locating fastener of claim 11; wherein the components are formed from a selective laser sintering process.

* * * * *